United States Patent Office 3,847,943
Patented Nov. 12, 1974

3,847,943
PREPARING ANETHOLE TRITHIONE USING SULFOLANE SOLVENT
Paul F. Warner, Phillips, Tex.
(% Phillips Petroleum Co., Bartlesville, Okla. 74004)
No Drawing. Filed Sept. 8, 1972, Ser. No. 287,248
Int. Cl. C07d 71/02
U.S. Cl. 260—327 C                3 Claims

ABSTRACT OF THE DISCLOSURE

Anethole trithione is prepared from anethole by reaction with sulfur at elevated temperature in presence of sulfolane as reaction solvent. Reaction byproduct complications are minimized with the sulfolane.

---

This invention relates to the preparation of anethole trithione. In one of its aspects it relates to the preparation of anethole trithione from anethole using sulfolane as a reaction solvent. In another of its aspects the invention relates to the preparation of high purity anethole trithione by reaction of anethole with sulfur at an elevated temperature using sulfolane as a solvent.

Thus in one of its concepts the invention provides a process for the production of anethole trithione which involves reacting with sulfur at an elevated temperature anethole. In another of its concepts the invention provides a process for the preparation of anethole trithione at an elevated temperature say at a temperature of the order of 350 to 450° F. using sulfolane as the solvent in a mole ratio of the order of 1:1 anethole to sulfolane to produce higher purity anethole trithione than heretofore available.

I have now discovered that using sulfolane as a reaction solvent for the reaction of anethole with sulfur to form anethole trithione at an elevated temperature considerably fewer byproducts are produced than when using other solvents e.g. toluene, xylene, N-methyl pyrrolidone, etc.

It is an object of this invention to produce anethole trithione. It is another object of this invention to provide a solvent for the reaction of anethole with sulfur in the production of anethole trithione. It is a further object of this invention to produce an anethole trithione of higher purity than heretofore obtained in such solvents, other than sulfolane, as are herein considered.

Other aspects, concepts, objects and the several advantages of this invention are apparent from a study of this disclosure and the claims.

According to the present invention there is provided a process for the preparation of anethole trithione which comprises reacting at an elevated temperature say of the order of 350 to 450° F. anethole with sulfur in the presence of sulfolane as a solvent.

Although one skilled in the art has sufficient disclosure at this point to enable him to adapt the invention to his particular purposes by exercising his routine skill in the chemical and related arts additional disclosure is given for sake of completeness.

It has been found that the number and amount of byproducts is inversely proportional to the amount of sulfolane used. While it is not known how the sulfolane works to inhibit byproduct formation or in other words to control the reaction it is now thought that there may be a partial breakdown of the sulfolane liberating $SO_2$ and unsaturated compounds. Obviously the invention is not in any way limited by this explanation of how the sulfolane works to inhibit byproduct formation.

The following illustrates the reaction:

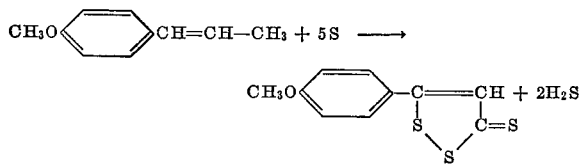

When sulfur and anethole are heated together in a stirred reactor, the sulfur first melts and goes into solution at about 200–220° F. On continued heating to about 350° F., an exothermic reaction sets in which carries the temperature to about 450° F. Hydrogen sulfide liberation becomes appreciable at about 420° F., and is quite rapid at 450° F. In most of the runs made according to the invention, a wet-test meter filled with Soltrol 130, a hydrocarbon solvent, was used to monitor the $H_2S$, and the runs were terminated when the desired amount of $H_2S$ had been evolved. At 450° F. about one hour is required to complete the reaction. The crude product has the appearance and consistency of road tar. On cooling and standing for several days, the tar solidifies somewhat due to crystal formation; it is too viscous to filter with suction at room temperature without addition of a solvent.

The following fractions have been separated from the crude reaction product.

(1) Black insoluble powder too fine to separate well by filtration, believed to be mostly carbon.
(2) A crystal fraction with a melting range of 169–170° C.
(3) Anethole trithione crystal fraction with a melting range of 104–106° C.
(4) Tar bottoms.
(5) Free sulfur (in some runs).

Anethole trithione has a melting point variously reported to be in the range of 108.5 to 111 [1].

Aside from repeated recrystallization, no method of recovering the anethole trithione of the desired purity from the crude tar has been found.

Chromatograms which were prepared of the crude mixtures obtained with various solvents show that runs with sulfolane yielded products much less cluttered with byproducts.

The following example shows runs in which the anethole/sulfolane mole ratio was varied from 1 to 100 and the mole ratio of sulfur to anethole was about 5.

It is seen that the number of byproducts varied inversely with the proportion of sulfolane employed.

---

[1] Reid, E. E., "Organic Chemistry of Bivalent Sulfur," vol. 3, pp. 48–55, 98–110, Chemical Publishing Co. (1960).

| Run no. | 17 | 18 | 19 |
|---|---|---|---|
| Anethole/sulfolane weight ratio | 1 | 10 | 100 |
| Mole ratio sulfur/anethole | 5 | 5 | 5 |
| Reaction temperature, °F | 450 | 420–450 | 420–450 |
| Composition, area percent on sulfolane free basis: | | | |
| Component: | | | |
| 1 | | 3.7 | 3.7 |
| 2 | | | 0.2 |
| 3 | | 0.2 | 0.2 |
| 4 | | 0.2 | 0.5 |
| 5 | 6.1 | 4.8 | 5.1 |
| 6 | | | 1.5 |
| 7 | | 0.7 | 0.8 |
| 8 | | 1.1 | 1.5 |
| 9 | | | 0.1 |
| 10 | | | 0.1 |
| 11 | 19.0 | 13.3 | 8.4 |
| Anethole trithione | 74.9 | 76.0 | 77.9 |
| Total | 100.0 | 100.0 | 100.0 |

It will be understood by one skilled in the art in possession of this disclosure that real problems exist in the separation or recovery of the anethole trithione product from the reaction product mass. The concept of the present invention is in the finding that a lesser number of byproducts clutter the crude reaction product when sulfolane is used as the solvent.

In the following tabulation the mole ratio of sulfur to anethole was varied and the reaction temperature was somewhat different from that earlier noted.

In the run at 2.5/1 mole ratio it was found that the crude tar could be more easily worked and the yield of crystals was still about the same as for the runs made at 5/1 mole ratio. Further it was found that the melting range of the crystals was about 10° C. higher than for the runs made at the higher mole ratio. Accordingly, the effect of mole ratio was explored in more detail. The following tabulation shows the results of this work.

| Mole ratio sulfur/anethole | 5 | 4.1 | 2.5 | 2.0 | 1.5 | 1.0 |
|---|---|---|---|---|---|---|
| Anethole charged, g | 296 | 296 | 296 | 296 | 296 | 296 |
| Synthesis temperature | 410 | 450 | 450 | 450 | 450 | 450 |
| Crystal yield, g | 169 | ¹127 | 94 | 94 | 54 | 29 |
| Melting range of crystals, C | 90–95 | 90–97 | 104–106 | 102–104 | 104–106 | 160–164 |
| Melting range on recrystallization | | 105–107 | | 105–108 | 99–102 | |

¹ Two crops combined.

These data show there was an advantage in crystal purity in running with a deficiency of sulfur in the range 2.5 to 1.5 mole sulfur to anethole. At a mole ratio of one, however, the primary product was not anethole trithione but was rather an unidentified compound having a melting range much higher than the desired trithione.

The anethole used was available in three grades U.S.P. (99+ weight percent), Technical (95+ weight percent) and Commercial (Arizole AH Heads, 75–85 weight percent). Runs were made using both Technical and Commercial grades. There appeared to be no real advantage in yield or purity in using Technical grade material.

Although a weight ratio of anethole/sulfolane of 1/1 is now preferred ratios of the order of 10/1 are satisfactory. Clearly a weight ratio of 100/1 has been shown to yield a large number of byproducts.

Further the data show that by operating with a deficiency of sulfur say in the approximate range 2.5/1 to about 1.5/1 mole ratio sulfur to anethole the crystal purity of the product anethole trithione is improved.

According to the equation for the reaction three moles of sulfur are required to react with the anethole to produce anethole trithione and two moles of sulfur react with the nascent hydrogen to form $2H_2S$.

The following data on thermal stability of sulfolane are from Shell's Technical Bulletin IC:63–13R

| Temperature | | Rate of decomposition, percent hr. |
|---|---|---|
| C | F | |
| 200 | 392 | 0.002 |
| 220 | 428 | 0.010 |
| 230 | 446 | 0.020 |

It will be noted that these temperatures are all in the range in which trithione synthesis takes place at an appreciable rate.

The following are data on byproducts obtained when other solvents were used. Analyses are reported in weight percent on a solvent-free basis:

| Solvent used | None | Anethole³ | DMF¹ | N-MP² |
|---|---|---|---|---|
| Lights | 3.93 | 5.05 | 8.85 | 13.56 |
| Unidentified: | | | | |
| 1 | 0.18 | 1.29 | 1.80 | 10.53 |
| 2 | 0.16 | 0.21 | 3.78 | 7.10 |
| 3 | 0.16 | 0.12 | 2.56 | 3.55 |
| 4 | 5.57 | 1.19 | 1.10 | 2.29 |
| 5 | 0.16 | 4.02 | 3.61 | 2.03 |
| 6 | 0.86 | 0.53 | 10.16 | 4.49 |
| 7 | 1.25 | 6.44 | 8.27 | |
| 8 | 0.19 | 1.65 | 1.95 | |
| 9 | 0.14 | 0.11 | 0.58 | |
| 10 | 13.65 | 0.45 | | |
| 11 | 3.79 | 0.52 | | |
| 12 | | 0.78 | | |
| Anethole trithione | 69.96 | ⁴77.64 | 57.33 | 37.57 |
| Heavies | | | | 18.88 |
| Total | 100.00 | 100.00 | 100.00 | 100.00 |
| Reaction temperature | 422–450 | 450 | 315–322 | 390–400 |

¹ Dimethylformamide. Added in equal weight to the anethole.
² N-Methylpyrrolidone. Added in equal weight to the anethole.
³ Two moles anethole/5 sulfur instead of the usual 1/5 ratio.
⁴ This appears to be two compounds only partially resolved by the chromatograph.

Numbers assigned to the unidentified components do not mean that the compounds listed adjacent to a number are necessarily the same. They may or may not be the same. In all probability they are not the same.

In studies made, a variety of materials were used in an attempt to find a way to make the trithione with less production of byproducts including tar, carbon, and unidentified crystals. These were as follows:

(1) Effect of temperature: Runs were made in refluxing toluene and xylenes at 255 and 305° F. respectively, to see if these lower-than-usual temperatures would give less byproducts. $H_2S$ liberation was very slow in the run with toluene even after addition of lime and triethanol amine as catalysts. After 15 hours at reflux, only 10 g. of crystals having a melting range of 146–154° C. were recovered from a charge of 317 g. of anethole. The product was obviously not 5-p-methoxyphenyl trithione whose melting point is about 110° C. however, the literature ² also reports a 4-p-methoxyphenyl trithione with a melting point of 152° C. The crystals on chromatograph analysis indicated only one component was present. It was verified that this was not the product needed.

In the run with xylene, diethylene triamine was added to catalyze the reaction. Without the catalyst there was no appreciable evolution of $H_2S$ at the boiling point of the mixture (305° F.). Even with catalyst, it took 18 hours for the stoichiometric amount of $H_2S$ to be liberated. A chromatogram of the crude product indicated that there were two close boiling components in the ratio of about 2/1 in the anethole trithione range. In this run only 97 g. of crude mixed crystals with a melting range of 88–90° C. was recovered from a charge of 296 g. of anethole.

² Reid, E.E., "Organic Chemistry of Bivalent Sulfur," vol. 3, p. 99, Chemical Publishing Co., Inc. (1960).

Tar and other byproducts were produced in both of the above last noted runs even at temperatures considerably below those normally required to get reaction. There did not appear to be any advantage in operation at low temperature.

(2) Effect of solvents: In addition to the runs with toluene and xylene as reaction media (reported in the preceding section), other runs were made with N-methylpyrrolidone (N-MP), dimethylformamide (DMF), and sulfolane. The runs with N-MP and DMF both produced crystals, but the melting points and other properties indicated they were not the desired product.

Reasonable variation and modification are possible within the scope of the foregoing disclosure and the appended claims to the invention the essence of which is that anethole is reacted with sulfur to form anethole trithione at an elevated temperature in the presence of sulfolane as a solvent.

I claim:

1. A process for the preparation of anethole trithione which comprises reacting anethole with sulfur at an elevated temperature of the order of 350 to 450° F. in the presence of sulfolane as a solvent.

2. A process according to claim 1 wherein the temperature is of the order of from about 350 to about 450° F., the weight ratio of anethole to sulfolane is of the order of from about 1/1 to about 10/1.

3. The process according to claim 1 wherein the reaction is operated with a deficiency of sulfur in the approximate range of from about 2.5/1 to about 1.5/1 mole ratio sulfur to anethole.

References Cited

UNITED STATES PATENTS

| | | | |
|---|---|---|---|
| 3,345,380 | 10/1967 | Hodgson | 260—327 C |
| 2,556,963 | 6/1951 | Gaudin | 260—125 |
| 2,653,910 | 9/1953 | Ains et al. | 252—45 |
| 2,658,900 | 11/1953 | Stevens et al. | 260—327 |
| 2,786,829 | 3/1957 | Stevens et al. | 260—139 |
| 3,322,834 | 5/1967 | Hill et al. | 260—609 |
| 3,494,899 | 2/1970 | Brown | 260—79.5 |

OTHER REFERENCES

Kirk-Othmer, Encyclopedia of Chem. Tech., 2nd ed., vol. 19, pp. 250-4 (1969).

JOHN D. RANDOLPH, Primary Examiner

U.S. Cl. X.R.

423—563